US005412721A

United States Patent [19]
Rager et al.

[11] Patent Number: 5,412,721
[45] Date of Patent: May 2, 1995

[54] METHOD FOR LOADING AND UTILIZING A KEY IN A SECURE TRANSMISSION DEVICE

[75] Inventors: Kent D. Rager; Steven H. Lay, both of Elgin, Ill.

[73] Assignee: Motorola, Inc., Schaumburg, Ill.

[21] Appl. No.: 37,794

[22] Filed: Mar. 26, 1993

[51] Int. Cl.$^6$ .......................... H04L 9/08; H04L 9/00
[52] U.S. Cl. ............................... 380/21; 380/9; 380/44; 380/49
[58] Field of Search ................ 380/4, 21, 28, 29, 43, 380/44, 49, 50, 46, 9

[56] References Cited

U.S. PATENT DOCUMENTS

| | | | |
|---|---|---|---|
| 4,418,275 | 11/1983 | Oosterbaan et al. | 380/46 X |
| 4,520,232 | 5/1985 | Wilson | 380/28 |
| 4,797,928 | 1/1989 | Dykes | 380/49 |
| 4,972,472 | 11/1990 | Brown et al. | 380/21 |
| 5,008,938 | 4/1991 | Freeburg et al. | 380/50 |

Primary Examiner—Bernarr E. Gregory
Attorney, Agent, or Firm—Timothy W. Markisson

[57] ABSTRACT

An encryption code and at least one key are provided to a secure transmission device, via an external keying device, and stored in a volatile memory. A user code, entered via a keypad by a user, is received by the secure transmission device. An encrypted representation of the at least one key, based on the encryption code and the at least one key, is generated and stored in a non-volatile memory. Also, an encrypted representation of the encryption code and the user code, based on the user code, are generated and stored in the non-volatile memory. Upon power down of the secure transmission device, the at least one key and encryption code stored in the volatile memory are erased.

11 Claims, 4 Drawing Sheets

METHOD FOR LOADING AND UTILIZING A KEY IN A SECURE TRANSMISSION DEVICE

FIELD OF THE INVENTION

The present invention relates generally to communication systems and, in particular, to a method of password protected storage of encryption keys.

BACKGROUND OF THE INVENTION

Communication systems are known to comprise mobile transmitters and receivers, such as in-car mobile or hand-held portable radios (mobiles), as well as fixed transmitters and fixed receivers, such as base stations or repeaters (fixed end). The mobiles and fixed end are operably coupled by separate transmit and receive communication paths. The communication paths between the mobiles and the fixed end are typically wireless links, such as radio frequency (RF) channels. The communication paths between fixed transmitters and receivers are typically wireline links, such as land-based phone lines.

A typical message within such a communication system may begin with a mobile unit converting an audio signal into a digital data stream suitable for transmission over an RF channel to either another mobile unit or the fixed end. Such systems are often used by public safety institutions, such as local or federal law enforcement agencies. The existence of commercially available RF scanners make it possible for unauthorized parties to monitor the information transmitted within such a communication system. In efforts to reduce unauthorized eavesdropping, communication systems use digital encryption methods that protect proprietary information transmitted therein.

Digital encryption methods use a known, reversible algorithm to introduce randomness into a digital data stream. To an unauthorized user, an encrypted digital data stream will appear random, and thus unintelligible. Such an algorithm that randomizes digital data is called an encryptor. By necessity, the same algorithm which is capable of encrypting the digital data stream must also be capable of recovering the digital data stream, and hence, is called a decryptor. Often, an encryptor/decryptor algorithm utilizes a dynamic parameter, hereafter referred to as a key, to uniquely specify the nature of the randomness introduced to the digital data stream. Thus, only encryptors and decryptors utilizing an identical algorithm and key are capable of reproducing intelligible messages. Obviously, the security of keys in systems utilizing encryption is of the utmost importance in the prevention of unauthorized monitoring. If the keys of a known encryptor/decryptor algorithm are made available, the ability of unauthorized parties to monitor proprietary communications is greatly enhanced.

Typically, the keys used by secure transmission devices, such as mobiles or fixed-ends, are stored in a volatile memory device such as RAM (Random Access Memory). This method of storage allows the transmission device to quickly access keys, as might be required for a feature such as encrypted mode channel scanning. Also, the use of a volatile memory allows the key information to be erased in the event that the transmission device loses power or is tampered with, thus maintaining security. For instance, if a transmission device is tampered with or the volatile memory is powered down (through the loss of battery backup, for instance), the information stored in volatile memory is passively erased. Passive erasure typically implies allowing the information stored in volatile memory to decay away with the loss of power. When the transmission device is subsequently powered up, however, an external device is typically required to reload the keys. This requirement can prove to be a nuisance in transmission devices in which power is frequently cycled, such as hand-held portable radios.

Thus, a need exists for a method which allows encryption keys to be stored without risk of unauthorized access and without the need for external key reloading when the device is repowered.

DESCRIPTION OF A PREFERRED EMBODIMENT

Generally, the present invention provides a method for loading and utilizing a key, in conjunction with a user code, for secure transmissions of information. The key is initially loaded into the secure transmission device by connecting an external keying device and initiating a keyload. The keying device transfers one or more keys and a random number (encryption code) to the secure transmission device, which are stored in a volatile memory, such as RAM. An encryption device within the secure transmission device uses the encryption code to produce encrypted representations of the keys which are stored in EEPROM (Electrically Erasable Programmable Read Only Memory). Additionally, the user of the secure transmission device enters a user code which is used to produce encrypted representations of the encryption code and user code, which are also stored in EEPROM.

Once a key has been loaded, the secure transmission device uses the user code, via the encryption device, to decrypt and thus recapture the encryption code stored in EEPROM. Likewise, the secure transmission device uses the recaptured encryption code, via the encryption device, to decrypt and thus recapture the keys stored in EEPROM. The recaptured keys and recaptured encryption code are loaded into RAM such that they may be used for encrypting and decrypting data. Finally, when the secure transmission device is turned off, the encryption code and recaptured keys are erased from RAM, but the encrypted representations of the keys and encryption code remain in the EEPROM such that the keys can be readily accessed when the secure transmission device is turned on.

Figure 1:
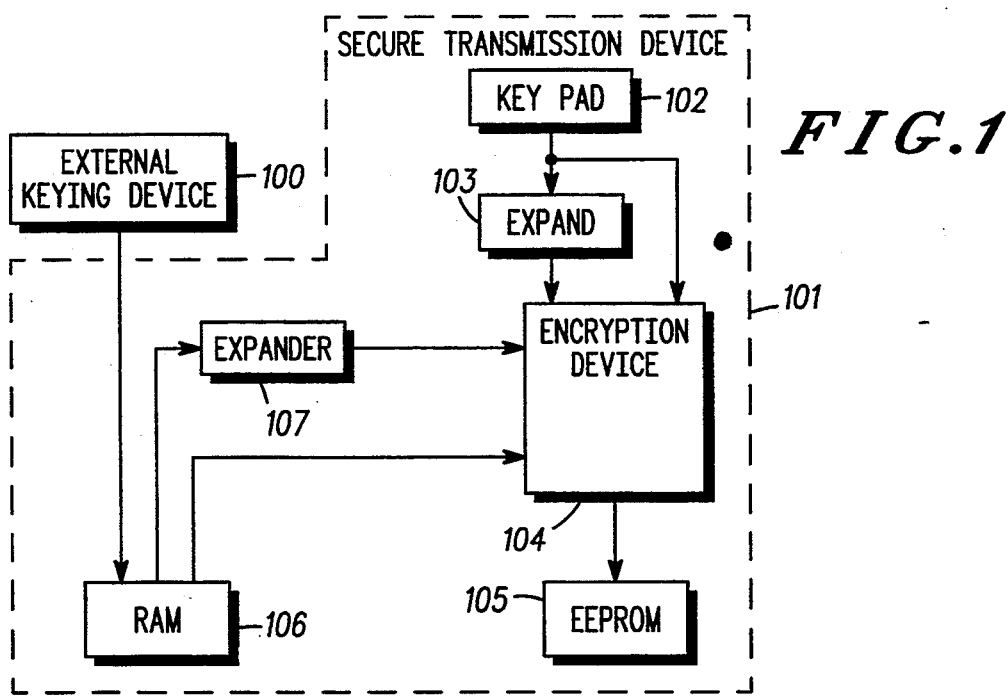
FIG. 1 illustrates an external keying device coupled to a secure transmission device in accordance with the present invention.

The present invention can be more fully described with reference to FIGS. 1–3. FIG. 1 illustrates a secure transmission device 101 coupled to an external keying device 100. (Note that the secure transmission device 101 may also be referred to as a secure communication unit and may comprise, for example, a Motorola ASTRO ™ digital radio.) The external keying device 100 may comprise a Motorola ASTRO ™ and Advanced SECURENET ™ Key Variable Loaders (KVL). The secure transmission device 101 comprises a volatile memory (RAM) 106, a nonvolatile memory (EEPROM) 105, a first expander 107 for expanding an encryption code into a key variable, an encryption device 104, a key pad 102, and a second expander 103 for expanding a user code into a key variable. The encryption device 104 may comprise a Motorola Data Encryption Standard (DES), Digital Voice International (DVI-XL), or Digital Voice Protection (DVP-XL) encryption device.

The external keying device 100 provides two pieces of information to the secure transmission device 101: an encryption code and at least one key. The KVL 100 transmits a random 64-bit value, referred to as the encryption code, to the secure transmission device 101. The secure transmission device 101 further randomizes the encryption code by reading a 16-bit free-running counter upon reception of the encryption code. This 16-bit value is exclusive-OR'd with 16 bits of the encryption code by the secure transmission device 101. The resulting value of this operation is loaded into a maximal length linear feedback shift register (LFSR), as is well known in the art, and shifted 64 times to "spread out" the randomizing effect of the exclusive-OR operation. The resulting 64-bit value left in the LFSR is the encryption code which is stored in the volatile memory 106.

The key pad 102 allows the user of the secure transmission device 101 to enter a user code, which can be an alphanumeric code. For example, the user code may comprise the concatenated, hexadecimal representations of ten digits (40 bits), with allowable digits 0–9. For user codes less than ten digits, the unused digits are filled with the hexadecimal digit 'A'.

In order to encrypt/decrypt any type of data, the encryption device 104 requires a key variable. As discussed above, such a key may come directly from a KVL. In a preferred embodiment, the encryption code and the user code may also be used to derive a key suitable for use in the encryption device 104. To this end, the first expander 107 is used to expand the 64-bit, random encryption code into a key variable for use in the encryption device 104. Likewise, the second expander 103 is used to expand the 40-bit user code into a key variable for use in the encryption device 104. Note that the secure transmission device 101 could contain more than one encryption device. Thus, when encrypting keys, it is recommended that the most secure encryption device available is used such that keys for a given algorithm are not encrypted by a less-secure encryption device. To this end, the first expander 107 determines what encryption devices are available and chooses the most secure one based on a fixed ranking. In a preferred embodiment, DES is ranked as the most secure, followed by DVI-XL and DVP-XL, respectively.

After choosing the encryption device 104, the first expander 107 formats the encryption code into a key for the chosen encryption device 104. In a preferred embodiment, the expansion process comprises modifying the encryption code for correct parity (for DES encryption devices), or concatenating the encryption code with a fixed value and appending a cyclical redundancy check (CRC), as are known in the art, calculated over the concatenated value, to the end of the concatenated value (for DVI-XL and DVP-XL encryption devices). Utilizing the same expansion processes discussed above and adjusted appropriately for the shorter length of the user code, the second expander 103 formats the user code into a key for the chosen encryption device 104. This is done by utilizing a BCH 63,39 code, as are well known in the art, to expand the 40-bit user code into 64 bits. The expansion of the resultant 64 bits into a key variable then proceeds as described previously.

In a preferred embodiment, the encryption device 104 is used for the encryption and decryption of multiple data types, including the user code, encryption code, keys, and message information to be transmitted and received. In all cases, the encryption or decryption is performed by using the encryption device 104 to generate a pseudo-random bit string, referred to as a keystream. First, a maximal length linear feedback shift register (LFSR), as is well known in the art, is used to generate a pseudo-random bit string which is placed on the cipher text input (CTI) of the encryption device 104. The encryption device 104 modifies the pseudo-random bit string received via the CTI based on the key stored in the encryption device 104. The modified or "decrypted" bit string is then placed on the plain text output (PTO) of the encryption device 104. The data recovered from the PTO is the keystream. The keystream is then exclusive-OR'd with unencrypted data to generate encrypted data or with encrypted data to generate decrypted data.

The non-volatile memory 105, which may comprise an EEPROM, is used to store encrypted representations of the user code, encryption code and key (or keys). These encrypted representations can remain in the non-volatile memory 105 whether the secure transmission device 101 is powered up or down. The volatile memory 106, which may comprise a RAM, is used to store the decrypted encryption code and decrypted keys only while the secure transmission device 101 is powered up.

Figure 2:
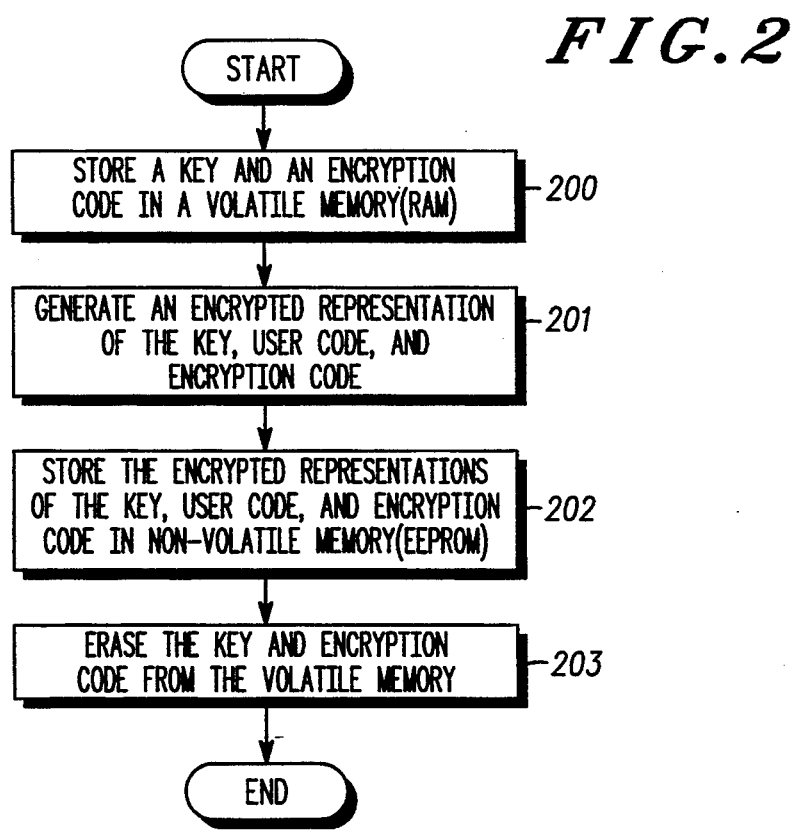
FIG. 2 illustrates a logic diagram that a secure transmission device could implement to load a key in accordance with the present invention.

FIG. 2 illustrates a logic diagram that the secure transmission device 101 could use to load a key in accordance with the present invention. At step 200, the external keying device 100 transmits an encryption code and key to the secure transmission device 101. If the secure transmission device 101 is currently not storing any keys, the encryption code and key are stored in the volatile memory 106. It is understood that more than one key can be loaded from the KVL. Upon storing the encryption code, a 16-bit CCITT (Consultative Committee on Telephony and Telegraphy) standard CRC, hereafter referred to as an encryption check code, is calculated over the encryption code and stored along with the encryption code in the volatile memory 106. In conjunction with the operations described above, a user code is entered by the user via the keypad 102. Furthermore, an invalid user code counter, used to keep track of invalid user code entries, is set to zero.

At step 201, the encrypted representations of the encryption code, user code, and at least one key are generated. First, the user code is expanded with the second expander 103 and the resulting key is loaded into the encryption device 104. A maximal length linear feedback shift register (LFSR) is then loaded with a fixed, 64-bit value. While the precise pattern of the 64-bit value is arbitrary, the same value must be used each time this process is repeated. The LFSR, starting from this value, produces a pseudo-random bit string as it is shifted. A fixed amount of data generated by the LFSR is sent to the encryption device 104, causing the encryption device 104 to synchronize. With the encryption device 104 synchronized, more data generated by the LFSR is sent to the encryption device 104 to produce a keystream as previously discussed. The keystream is then exclusive-OR'd with the encryption code, encryption check code, and the user code to produce encrypted representations of the encryption code, encryption check code, and user code, which are then stored 202 in the non-volatile memory 105.

In a preferred embodiment, the secure transmission device 101 is capable of storing up to 18 key variables. Thus, there exist 18 slots in non-volatile memory 105 and 18 slots in volatile memory 106 for the storage of keys. After receiving at least one key variable, the secure transmission device 101 generates a keystream, as described above, and stores it in at least one of the 18 slots in volatile memory 106. This keystream is generated based on the key formed from the expansion of the encryption code, by the first expander 107, which is loaded in the encryption device 104. As before, the LFSR is loaded with a fixed value, the encryption device 104 is synchronized, and enough keystream is generated to completely fill the at least one slots in volatile memory 106.

Each byte of the received key is exclusive-OR'd with its respective byte of keystream to form the encrypted representation of the key variable. The encrypted representation of the key is stored 202 in the appropriate slot in non-volatile memory 105. In a preferred embodiment, appropriate slots in the non-volatile memory 105 and the volatile memory 106 are determined by slot indicators transmitted by the external keying device 100 along with the keys. The key is then stored in place of the keystream in the appropriate slot of volatile memory 106. This process is repeated for each key sent to the secure transmission device 101.

The encryption code sent to the secure transmission device 101 by the external keying device 100 is only used when the secure transmission device 101 currently contains no key variables in any of the 18 slots. If one or more keys already exist in any of the 18 slots, the encryption code is ignored. In this case, the encryption code used when the existing keys were loaded is used again. Furthermore, if the external keying device 100 attempts to store a key in a slot already occupied, the secure transmission device 101 first recovers the keystream for that slot by exclusive-OR'ing the key already stored in that slot of volatile memory 106 with its encrypted representation stored in the corresponding slot of non-volatile memory 105. The recovered keystream is exclusive-OR'd with the new key to produce the encrypted representation of the new key. The encrypted representation of the new key is then stored in its appropriate slot of non-volatile memory 105. Finally, the new key is stored in place of the recovered keystream in it's appropriate slot of volatile memory 106.

In the event of a power down, the encryption code, keys and keystream (in empty slots) are erased 203 from the volatile memory 106. Thus, the only pieces of sensitive information (the encrypted representations of the encryption code, user code, and keys) within the secure transmission device 101 are secure by virtue of their encrypted state. The only way to recover the unencrypted forms of this data is with the user code.

Figure 3A:
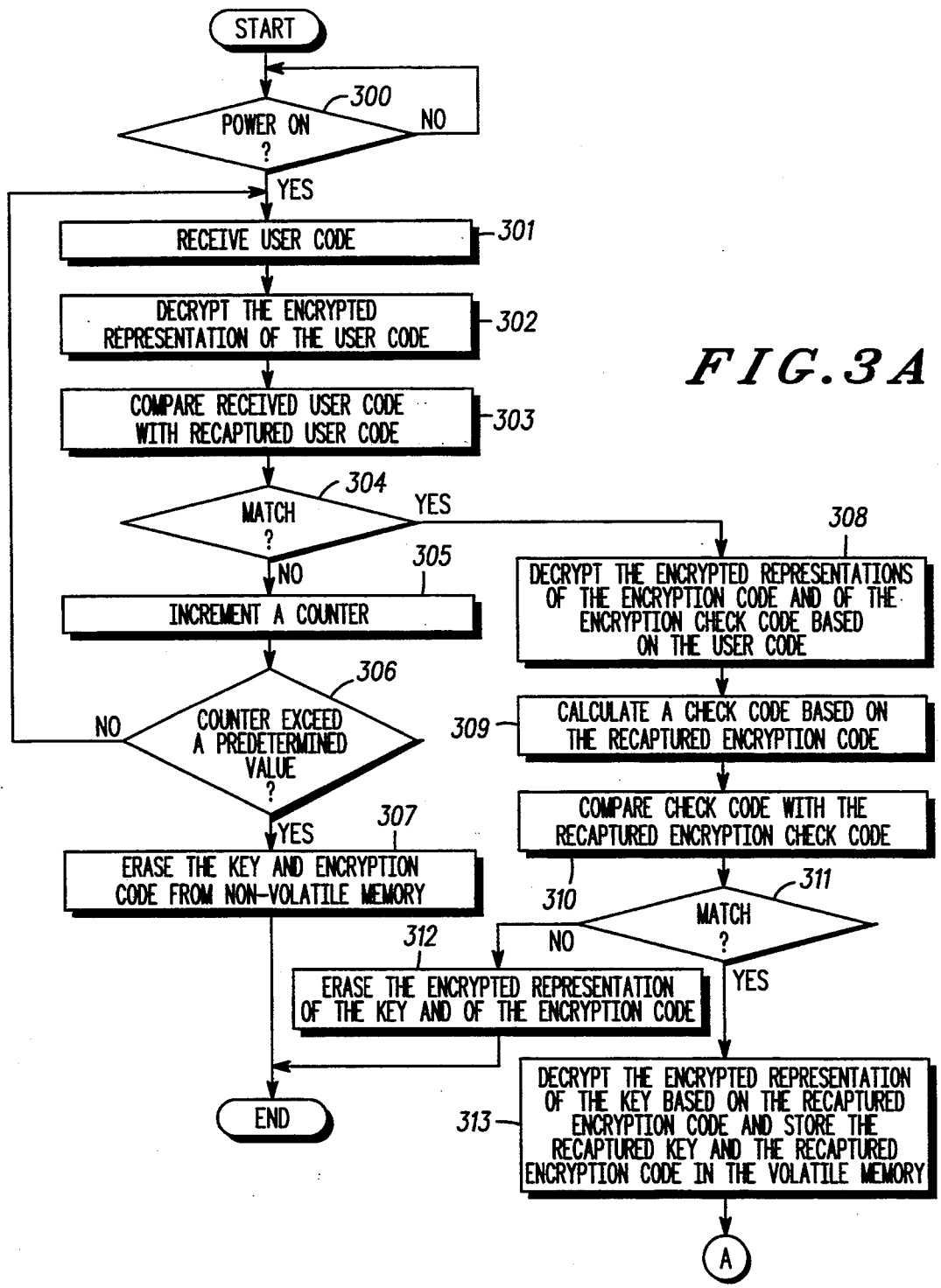
FIGS. 3A, 3B and 3C illustrate a logic diagram that a secure transmission device could implement to utilize a key in accordance with the present invention.
Figure 3B:
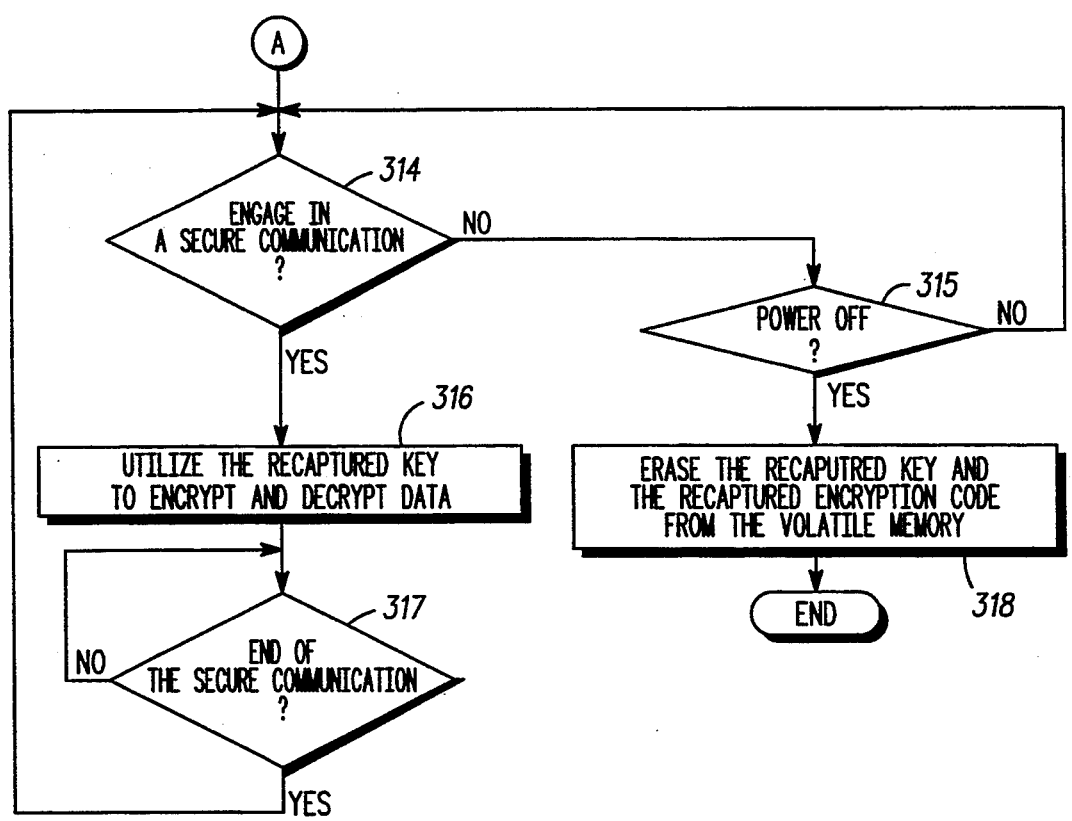
Figure 3C:
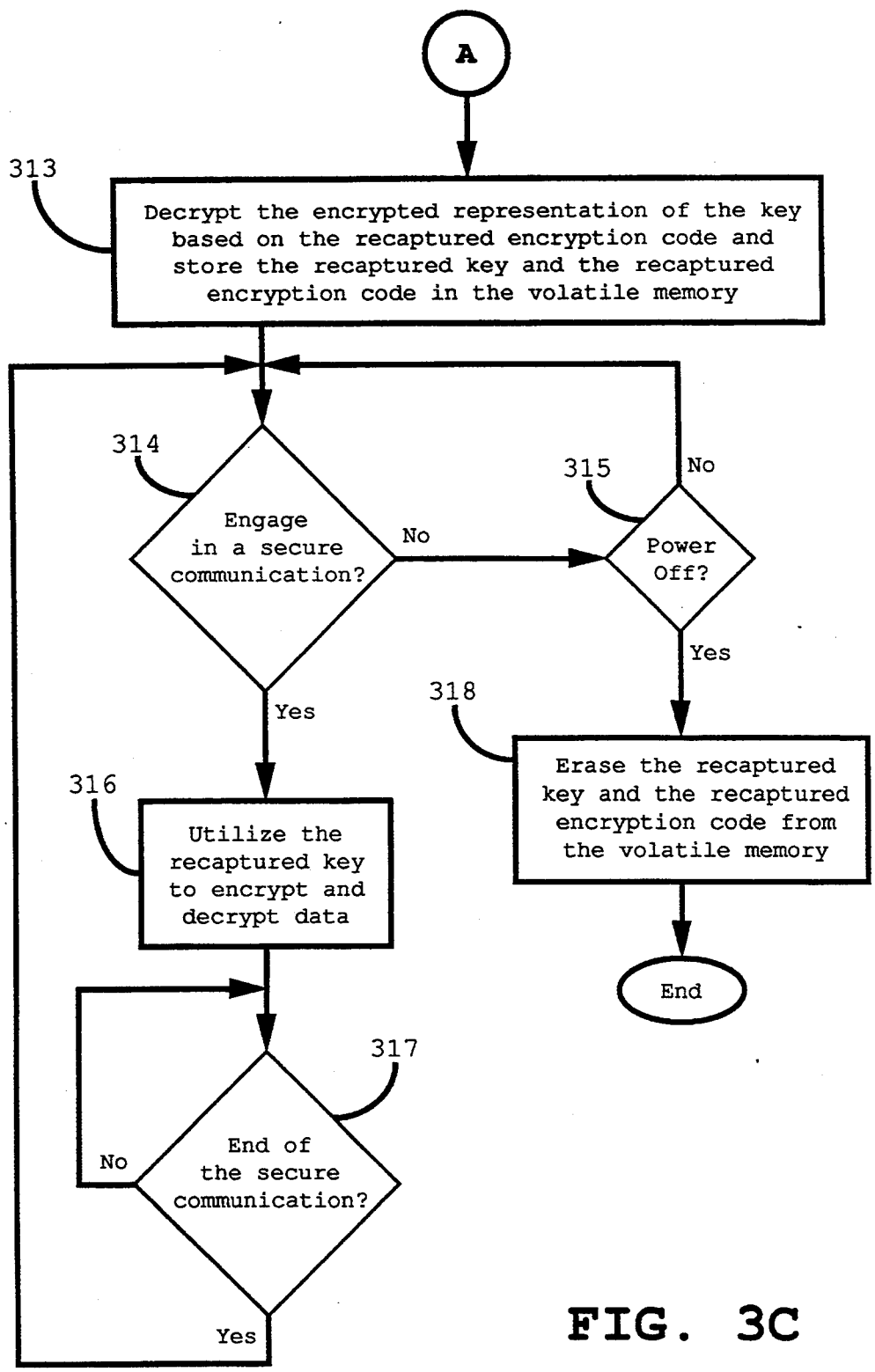

FIG. 3 illustrates a logic diagram which can be implemented to utilize encrypted representations of keys stored within the secure transmission device 101. It is assumed at this point that encrypted representations of the encryption code, encryption check code, user code, and at least one key are stored in the non-volatile memory 105.

Upon power up 300, a user code is entered 301, via the keypad 102, to produce a received user code which is then expanded into a key variable by the second expander 103. The resultant key variable is then loaded into the encryption device 104 and used to generate a keystream as described previously. As before, the LFSR is loaded with a fixed value, the encryption device 104 is synchronized, and enough keystream is generated to decrypt the encryption code, encryption check code, and user code. The keystream generated for decrypting the encryption code and the encryption check code is discarded. The remaining keystream is exclusive-OR'd with the encrypted representation of the user code to produce a recaptured user code 302.

The recaptured user code is compared with the received user code 303. If they do not match 304, the invalid user code counter, which is stored in non-volatile memory 105, is incremented 305. The invalid user code counter is compared 306 with a predetermined value which describes the maximum number of allowed invalid entries. For example, the predetermined value may be in the range from 3 to 20. This predetermined value is fixed and is dependent upon the desired security level of the the secure transmission device 101. If the predetermined value is exceeded 306, the encrypted representations of the keys and the encryption code are erased 307 from non-volatile memory 105. At this point, an external keying device 100 must be connected to the secure transmission device 101 and new keys loaded, as described above, in order to use the secure transmission device 101 again. If the predetermined value has not been exceeded 306, a new user code is required and flow returns to step 301.

If the recaptured user code and the received user code match 304, the encrypted representation of the encryption code, in non-volatile memory 105, is decrypted 308. At this point, the key formed from the received user code is still loaded in the encryption device 104. The encryption code and encryption check code are recaptured using the encryption device 104 to generate keystream in the same manner as done when the encrypted representation was formed. As before, the LFSR is loaded with a fixed value, the encryption device 104 is synchronized, and a keystream is generated. The keystream is then exclusive-OR'd with the encrypted representations of the encryption code and encryption check code to produce the recaptured encryption code and recaptured encryption check code 308. At this time, the invalid user code counter is reset to zero due to the reception of a valid user code.

In order to verify the integrity of the recaptured encryption code, a check code is calculated 309, in the same manner as the original encryption check code, over the recaptured encryption code. The check code is compared 310 to the recaptured encryption check code. If the check code and the recaptured encryption check code match 311, the recaptured encryption code is assumed to have been decrypted correctly.

If the check code and the recaptured encryption check code do not match 311, the encrypted representations of the encryption code and key variables are erased 312 from non-volatile memory 105 since they are no longer capable of being decrypted. This situation may result if a failure condition, such as a memory device failure, occurs within the secure communication device 101. At this point, an external keying device 100 must be connected to the secure transmission device 101 and new keys loaded, as described above, in order to use the secure transmission device 101 again.

If the check code matches the recaptured encryption check code 311, the encrypted representations of the keys, stored in non-volatile memory 105, are decrypted, based on the key variable expansion of the recaptured encryption code by the first expander 107, and stored 313 in the volatile memory 106. The decryption of the encrypted representations of the keys is accomplished as described above. As before, the LFSR is loaded with a fixed value, the encryption device 104 is synchronized, and keystream is generated. The keystream is stored in all of the volatile memory 106 key slots and each key slot of non-volatile memory 105 is checked for the presence of an encrypted representation of a key. If no encrypted representation of a key is present in a given key slot of non-volatile memory 105, the keystream is left in the corresponding key slot of the volatile memory 106. If an encrypted representation of a key is present in non-volatile memory 105, each byte of keystream stored in the corresponding key slot of volatile memory 106 is exclusive-OR'd with the corresponding byte of the encrypted representation of the key variable stored in non-volatile memory 105, resulting in a recaptured key. The recaptured key variable is then stored in place of the keystream in its corresponding slot of volatile memory 106. This process is repeated for all of the key slots.

Having stored all possible recaptured keys into their corresponding slots in volatile memory 106, it is determined 314 if a secure communication is to take place. If a secure transmission is to occur, a recaptured key in one of the 18 key slots of volatile memory 106 is loaded into the encryption device 104. The encryption device 104 is then used 316 for the encryption and decryption of transmitted and received information.

Upon detecting the end of the current secure communication 317, it is determined 314 that a secure communication is no longer taking place. If power has not been removed 315, the secure transmission device 101 continues to await a secure communication 314.

If, however, power has been removed 315, the recaptured encryption code and all 18 key variables (or keystream if a key is not present in a given slot) are erased 318 from the volatile memory 106. Additionally, the key in the encryption device 104, if any, is erased. At this point, all sensitive information has been removed from the secure transmission device 101. The only piece of sensitive information (the user code) is possessed by the user. The only information now in the secure transmission device 101 is the encrypted representations of the user code, the encryption code and the keys. The only way to gain access to the unencrypted representations of this information is with the user code.

The present invention provides a way for encryption keys which are actively erased from RAM at power down, to be recovered on subsequent power ups without compromising the security of the communication unit in which they are contained and without requiring an external keying device to load the keys. By leaving only encrypted representations of the keys in EEPROM, keys can be decrypted and recovered with the entry of the proper user code when necessary.

We claim:

1. A method for loading a key into a secure transmission device, the method comprises the steps of:

a) storing the key and an encryption code in a volatile memory, wherein the key and the encryption code are provided by an external keying device;
   b) receiving a user code, wherein the user code is generated by a user of the secure transmission device;
   c) generating, by an encryption device, an encrypted representation of the key based on the key and the encryption code;
   d) generating, by the encryption device, an encrypted representation of the encryption code based on the encryption code and the user code;
   e) generating, by the encryption device, an encrypted representation of the user code based on the user code;
   f) storing the encrypted representation of the key, the encrypted representation of the encryption code and the encrypted representation of the user code in a nonvolatile memory; and
   g) erasing the key and the encryption code from the volatile memory.

2. In the method of claim 1, step (a) further comprises storing multiple keys in the volatile memory.

3. The method of claim 2 further comprises storing multiple encryption codes in the volatile memory.

4. In the method of claim 1, step (g) further comprises removing power from the volatile memory such that its contents are lost.

5. A method for loading a key into a secure communication unit, the method comprises the steps of:

a) storing the key and an encryption code in a volatile memory, wherein the key and the encryption code are provided by an external keying device;
   b) receiving a user code, wherein the user code is generated by a user of the secure communication unit;
   c) generating, by an encryption device, an encrypted representation of the key based on the key and the encryption code;
   d) generating, by the encryption device, an encrypted representation of the encryption code based on the encryption code and the user code;
   e) generating, by the encryption device, an encrypted representation of the user code based on the user code;
   f) storing the encrypted representation of the key, the encrypted representation of the encryption code and the encrypted representation of the user code in a nonvolatile memory; and
   g) erasing the key and the encryption code from the volatile memory.

6. A method for a secure transmission device to utilize a key to transmit secure data, wherein an encrypted representation of the key, an encrypted representation of an encryption code, and an encrypted representation of a user code are stored in nonvolatile memory, the method comprises the steps of:

a) receiving, by the secure transmission device, a user code to produce a received user code;
   b) decrypting, by an encryption device, the encrypted representation of the user code based on the received user code to produce a recaptured user code;
   c) comparing the recaptured user code with the received user code;
   d) when the recaptured user code and the received user code match, decrypting, by the encryption device, the encrypted representation of the encryption code based on the received user code to produce a recaptured encryption code;

e) when the recaptured user code and the received user code match, decrypting, by the encryption device, the encrypted representation of the key based on the recaptured encryption code to produce a recaptured key;

f) storing the recaptured key in volatile memory;

g) when engaging in a secure communication, utilizing the recaptured key to encrypt and decrypt transmitted data by the secure transmission device; and h) when the secure transmission device is disabled, erasing the recaptured key from volatile memory.

7. The method of claim 6 further comprises storing the recaptured encryption code in volatile memory.

8. In the method of claim 7, step (h) further comprises erasing the recaptured encryption code from volatile memory.

9. The method of claim 6 further comprises the following steps:

d) when the recaptured user code and the received user code match, receiving, by the secure transmission device, a second user code to produce a second received user code;

e) generating, by the encryption device, an encrypted representation of the second received user code based on the second received user code; and f) overwriting in the nonvolatile memory, the encrypted representation of the user code with the encrypted representation of the second received user code.

10. The method of claim 6 further comprises the following steps:

d) when the recaptured user code and the received user code do not match, setting a counter;

e) continually receiving, by the secure transmission device, a subsequently received user code to produce a plurality of subsequently received user codes;

f) for each of the plurality of subsequently received user codes, decrypting, by an encryption device, the encrypted representation of the user code based on the plurality of subsequently received user codes to produce a plurality of recaptured user codes;

g) when the recaptured user code and the received user code do not match for each of the plurality of recaptured user codes, incrementing the counter; and h) when the counter exceeds a predetermined value, erasing the encrypted representation of the key and the encrypted representation of the encryption code from nonvolatile memory.

11. A method for a secure transmission device to utilize a key to transmit secure data, wherein an encrypted representation of the key, an encrypted representation of an encryption code, an encrypted representation of an encryption check code, and an encrypted representation of a user code are stored in nonvolatile memory, the method comprises the steps of:

a) receiving, by the secure transmission device, a user code to produce a received user code;

b) decrypting, by an encryption device, the encrypted representation of the user code based on the received user code to produce a recaptured user code;

c) comparing the recaptured user code with the received user code;

d) when the recaptured user code and the received user code match, decrypting, by the encryption device, the encrypted representation of the encryption code and the encrypted representation of the encryption check code based on the received user code to produce a recaptured encryption code and a recaptured encryption check code;

e) calculating a check code based on the recaptured encryption code;

f) comparing the check code and the recaptured encryption check code;

g) when the recaptured encryption check code and the check code match, decrypting, by the encryption device, the encrypted representation of the key based on the recaptured encryption code to produce a recaptured key;

h) storing the recaptured key in volatile memory;

i) when engaging in a secure communication, utilizing the recaptured key to encrypt and decrypt transmitted data by the secure transmission device; and j) when the secure transmission device is disabled, erasing the recaptured key from volatile memory.

* * * * *